United States Patent [19]
Ferguson et al.

[11] Patent Number: 6,064,984
[45] Date of Patent: May 16, 2000

[54] GRAPHICAL USER INTERFACE FOR A COMPUTER-IMPLEMENTED FINANCIAL PLANNING TOOL

[75] Inventors: Mark G. H. Ferguson; Gary E. Epple; Michael D. Broadway; George P. Erwin-Grotsky; John T. Reynolds, all of Austin, Tex.

[73] Assignee: MarketKnowledge, Inc., Austin, Tex.

[21] Appl. No.: 08/705,195

[22] Filed: Aug. 29, 1996

[51] Int. Cl.[7] .................................................... G06F 17/60
[52] U.S. Cl. ........................... 705/36; 345/334; 705/35; 707/502; 707/503
[58] Field of Search ........................ 705/35, 36; 345/334, 345/440; 707/502, 503

[56] References Cited

U.S. PATENT DOCUMENTS

| | | |
|---|---|---|
| 5,339,393 | 8/1994 | Duffy . |
| 5,388,197 | 2/1995 | Rayner . |
| 5,471,575 | 11/1995 | Giansante . |
| 5,644,727 | 7/1997 | Atkins ....................................... 705/36 |
| 5,675,746 | 10/1997 | Marshall ................................... 705/35 |
| 5,774,878 | 6/1998 | Marshall ................................... 705/35 |

OTHER PUBLICATIONS

Nxt$ Manual, Sterling Wentworth Corp., 57 West 200 South, Suite 510, Salt Lake City, UTah 84101, 1992.

*Primary Examiner*—Edward R. Cosimano
*Attorney, Agent, or Firm*—Haynes and Boone, LLP; Michael A. Davis, Jr.

[57] ABSTRACT

On a display screen of a computer, temporal data are displayed for use in financial planning. On the display screen, a timeline is displayed in a substantially diagonal orientation relative to a 2-dimensional coordinate system. A first axis of the coordinate system represents a financial amount, and a second axis of the coordinate system represents a time amount. An icon is retrieved and positioned on the display screen to cause the display of at least one or more representations of the icon position in the 2-dimensional coordinate system relative to the timeline.

21 Claims, 12 Drawing Sheets

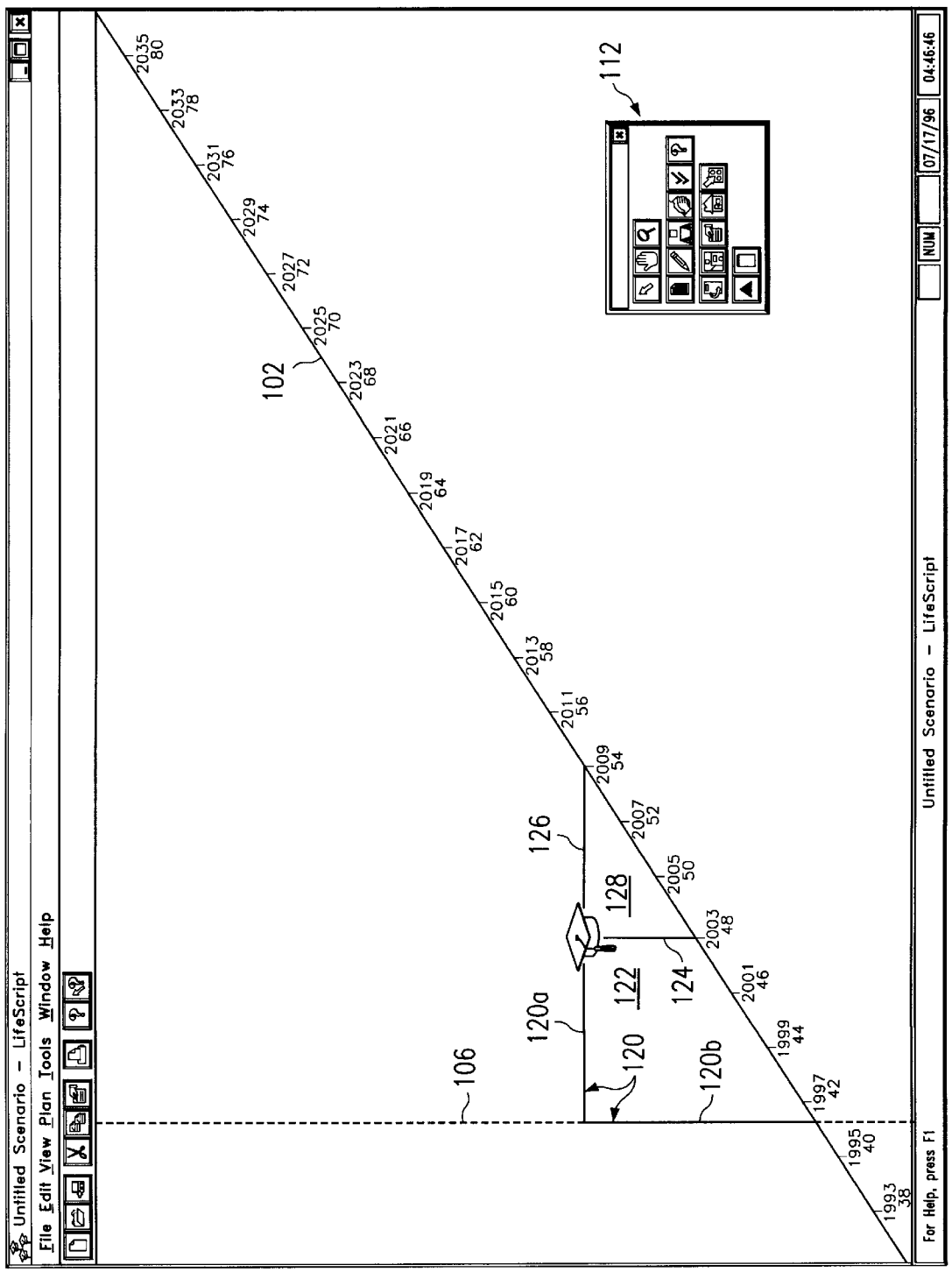

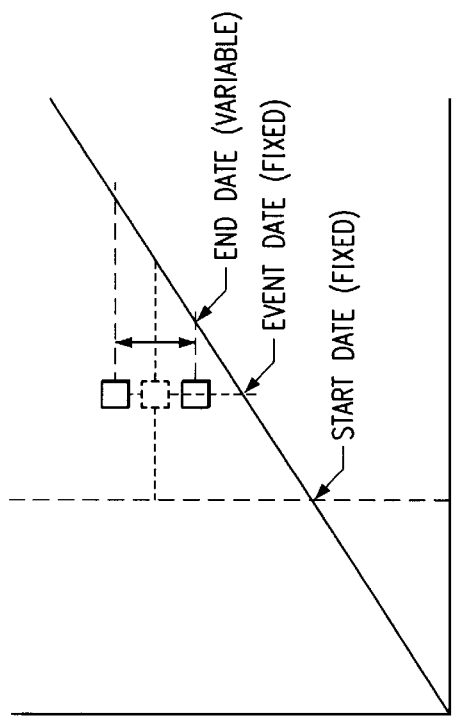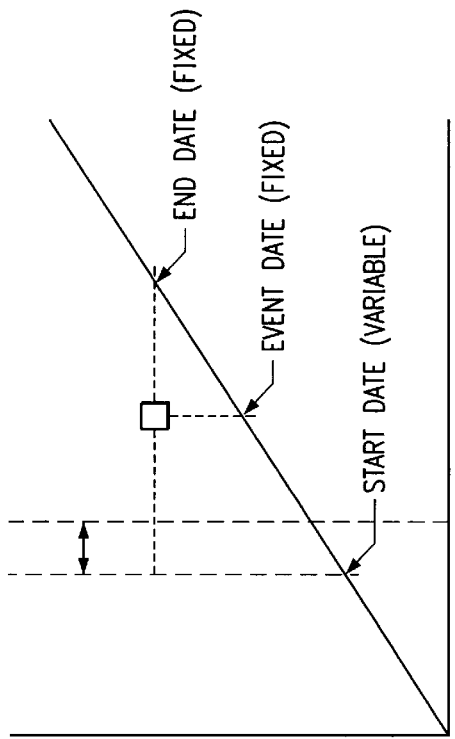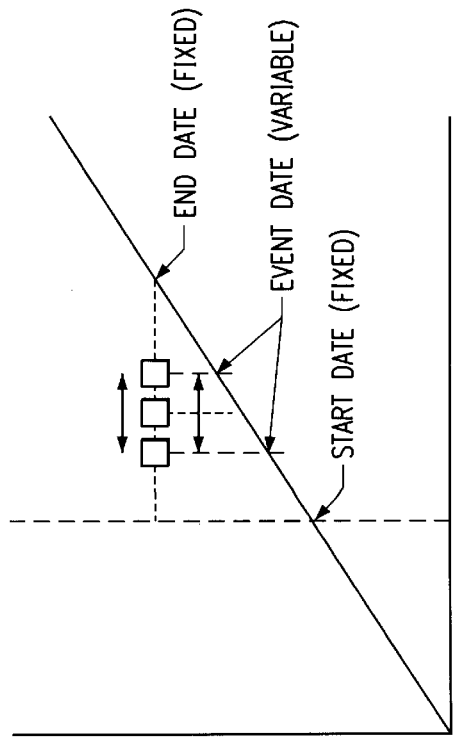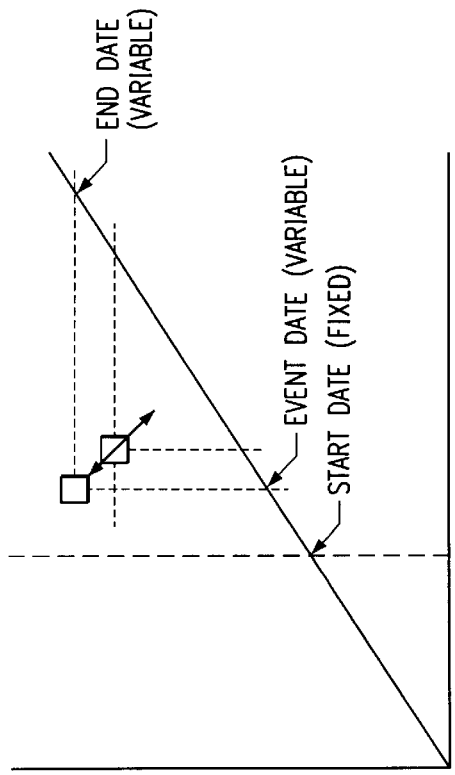

GRAPHICAL USER INTERFACE FOR A COMPUTER-IMPLEMENTED FINANCIAL PLANNING TOOL

TECHNICAL FIELD

This invention relates generally to computer-implemented methods for financial planning and novel techniques for displaying associated temporalbased data.

BACKGROUND OF THE INVENTION

Financial planning is a crucial, yet complex task. There are a myriad of financial vehicles that one may chose from to fund various life "events" (e.g., the purchase of a home, or the payment of a child's college education, etc.), and perhaps just as many sources of "advice" about how one should go about doing so. One may elect to "research" the various product and service offerings to setup an appropriate plan or, as is more commonly the case, knowledgeable persons may be consulted for this purpose. Professional brokers and financial planners typically have access to much more financial information as well as a wide variety of product offerings, but such information is normally provided to the consumer verbally or in some other terse fashion that makes it very difficult for the consumer to ascertain the "value" of the information.

There have been attempts to ameliorate this situation through the use of various computer-implemented planning tools. Thus, for example, life insurance brokers have the capability of entering personal and insurance plan data into a software program, which is then used to generate a table reflecting, among other things, the "value" of a policy over the life of the customer. Similar attempts have been made to display or illustrate temporal data in the context of a customer's "lifetime," but such techniques do not have interactive capabilities so that one or more information variables can be easily manipulated to change the plan results, and they do not display the temporal information in a easy-to-read and useful format. Moreover, there is no financial planning tool currently available that provides effective display of temporal data, or the storage and manipulation of financial product descriptions for use in conjunction with such data in order to facilitate creation of a viable financial plan.

BRIEF SUMMARY OF THE INVENTION

It is thus a primary object of the invention to provide financial planning assistance using a computer.

It is another more particular object of the invention to provide a unique graphical framework or "canvas" to facilitate the providing of financial advice to a customer. This canvas is used to display temporal data in a convenient and easily understood manner.

It is still another object of the invention to provide such a display framework in conjunction with a repository of information about financial products so that a financial plan can be created on-line using the display.

A still further object of the invention is to provide a computer-implemented method of financial planning to be used by a broker and a customer together in an interactive manner.

Another object of this invention is to provide a graphical framework for capturing a customer's financial goals and objectives and mapping them into a viable financial plan. A financial plan is stored in a database for retrieval and review, which may include automated plan re-evaluation based on current financial instrument pricing obtained via a computer network. When this technique is used, the holdings in a customer's plan are "re-valued" based on current prices and compared to the expected results in the plan.

An important object of the invention therefore is the provision of computer tools that enable a customer to participate in substantially all aspects of the financial planning process from goal definition through financial product selection. Such participation may be a very high level (e.g., allowing a general description of one's financial goals and investment strategy) to a very detailed participation (e.g., where the customer fully defines each cost constituent in a particular event, and each down payment and installment of each individual holding).

It is still another important object of the invention to provide a broker or other financial planner with a powerful, intuitive user interface in conjunction with on-line financial product information access.

More generally, it is an object of the invention to eliminate the abstract nature of personal financial analysis and planning with the assistance of a visually expressive display interface.

It is another more general object of the invention to provide a point-of-sale software tool that may be used by professional securities representatives for providing investment and risk management guidance to customers. Preferably, the software uses a unique graphical user interface (GUI) that consolidates large quantities of customer information, product information, financial assumptions and knowledge of the financial markets into icons, representations, metaphors, gauges, active interface devices and other symbolic representations. The unique interface facilitates the use of progressive disclosure and selective input, allowing the broker and/or the customer to go to deeper levels of detail as may be desired, thereby providing effective management and delivery of a large amount of available data.

The present invention thus provides a computer-implemented financial planner that obtains large quantities of information, e.g., from the customer, from financial product providers, from a library of historic and contemporary market information, and the like, and presents that information in a rich graphic medium in conjunction with an expert system to thereby enable financial decision making.

According to a preferred embodiment of the invention, a method for displaying temporal data on a computer screen is provided that is useful to facilitate financial planning. The method begins by displaying a timeline in a substantially diagonal orientation relative to a 2-dimensional coordinate system on the display screen. The timeline is divided into increments representing predetermined time periods (e.g., years) of a customer's life. The timeline preferably begins at predetermined point, e.g., the customer's age of majority, or the customer's current age. A "fence" line is also displayed on the timeline, preferably corresponding to the date of the financial plan. According to the method, an icon is then selected from a menu and appears on the fence line. In the preferred embodiment, the icon represents a so-called "life event" (such as funding for a child's college education or buying a house). Using direct manipulation or other input technique, the user "grabs" the icon and positions it on the canvas at a date on which the event will occur, which will typically be in the future. This new position represents the event date. Placement of the icon at the event date causes the display of one or more symbolic representations that provide useful information to the broker/customer. These representations reflect that the realization of a financial goal typically involves multiple stages and activities potentially including planning, investment and saving, and goal execution and payoff through loans and the like.

In particular, once the icon is re-positioned from the fence line to the event date (which is selectable), one or more additional "arms" are displayed relative to the icon and the timeline. Preferably, a first arm has a first segment that extends horizontally from the (repositioned) icon back to the fence line (or some other vertical reference line) and a second segment that projects vertically downward from the first segment of the first arm to thereby intersect with the timeline itself. The area enclosed by the timeline and the first arm (which is preferably to the left of the timeline) then forms a planning phase, which includes the period of time for investment and/or savings, for the life event. Movement of the icon to the event date also preferably causes a second arm to drop vertically from the icon to intersect with the timeline, and a third arm to extend horizontally from the icon to intersect with the (diagonal) timeline at some future date. The intersection of the second arm with the timeline determines the event date, and the intersection of the third arm with the timeline represents an "end" date at which the event is fully realized (e.g., all financial obligations are complete including payouts and/or loan repayments). The area enclosed by the timeline and the second and third arms represents a realization phase, which includes the period of time for the dispersement of saved funds and/or the repayment of event loans, for the life event.

One or more life event icons may be displayed simultaneously. In addition, the temporal attributes of an event may be conveniently changed by manipulating the icon to yet another position to change the event date. This may be accomplished by clicking on and dragging the plan event icon or one or more of the arms.

Once a life event is defined by positioning the icon (and perhaps the arms) to establish the planning and realization phases for the event, the user displays a property sheet summary for the event. The summary provides "at-a-glance" information about the event, e.g., its cost, the amount of the cost to be met through investment, the amount of the cost to be met through borrowing, etc. Additional data is then provided to the model using one or more "tabs" that open up more detailed interfaces in which data can be entered, displayed and applied to the financial plan.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 6 illustrates the generation of a life event planning/realization phases by positioning a life event icon on the canvas of FIG. 5;

FIGS. 7A–7D illustrate the repositioning of the icon in various ways to modify temporal attributes of the event;

DETAILED DESCRIPTION

The present invention is described in the context of a financial planning tool. Those skilled in the art will appreciate that this application is merely exemplary and that various aspects of the invention may be implemented in other areas where it is desired to provide temporal-based planning using various sources of information and in which an event date may exist in the future and have associated therewith a planning phase (which typically predates the event date) and a realization phase (which typically postdates the event date but relates to it in some way). One such example would be a tool for creating a product plan, wherein the event date would correspond to the start of manufacture of the product, the planning phase would correspond to the period during which the product is designed and developed, and the realization phase would correspond to the useful life of the product during which capital or other expenditures relating to the product might be expensed or otherwise accounted for in some manner. Since the preferred embodiment is a financial planning tool, the remainder of this detailed description will be directed thereto.

Figure 1:
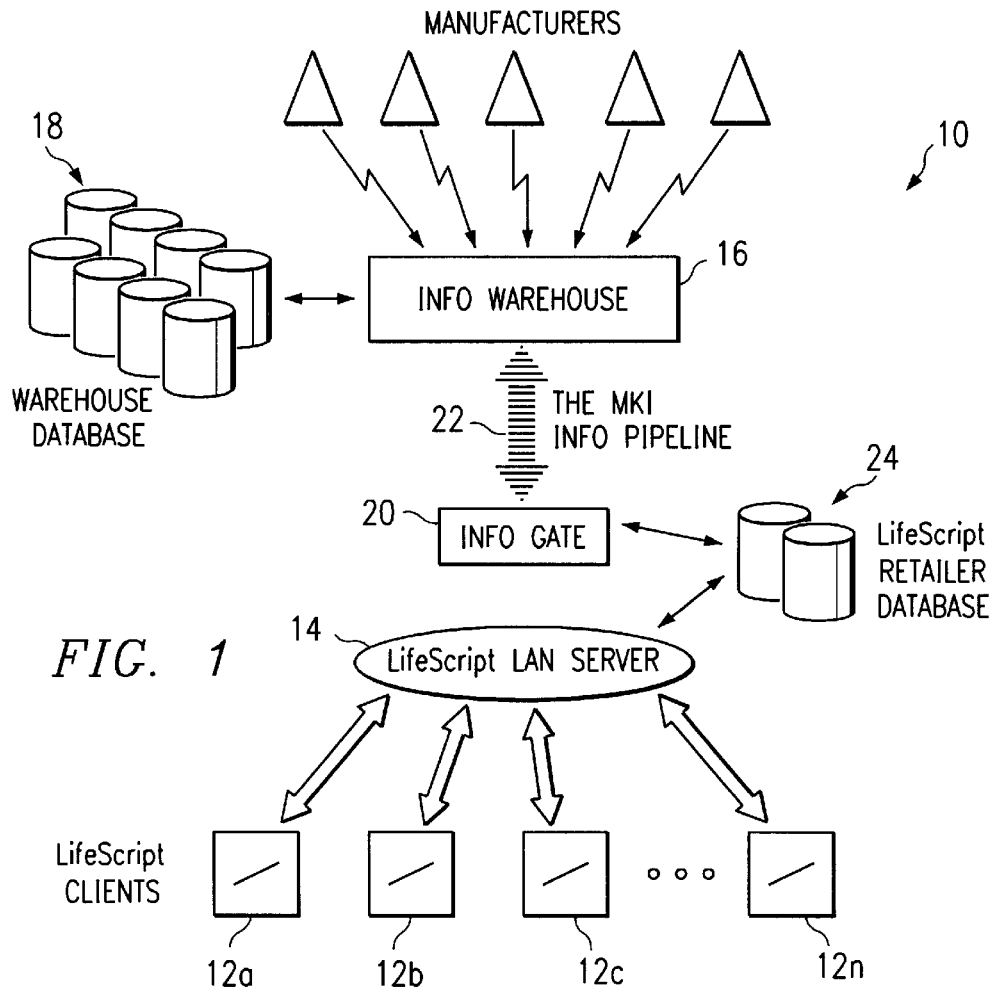
FIG. 1 illustrates a financial planning system in which the present invention is implemented.

Turning now to FIG. 1, a schematic diagram is shown of the financial planning system 10 of the present invention. The system 10 preferably includes a number of functional subsystems or components forming a hierarchy. At the lowest level, a plurality of client computers 12a–12n are interconnected in a local area network (LAN) or other convenient manner in order to share data and resources. Each of the client computers 12 is designed to be used by a broker or other person providing financial advice to a customer and includes a powerful, intuitive graphical user interface as will be discussed in detail below.

As represented in FIG. 1, the clients are located at a "retailer" site and connected in a known manner to a LAN server 14, which provides various control functions. The server 14 also facilitates interconnection to an information warehouse 16, which is preferably configured remotely from the site as a physically secure electronic repository for the storage of financial product descriptions and associated data that may be accessed by the clients. Such descriptions and data are supplied to the information warehouse (preferably electronically) by one or more manufacturers (i.e., product suppliers) and are stored in the warehouse database 18. Although not meant to be limiting, the information warehouse includes a master directory of all available products and services, product brochures and information, a financial industry knowledge database (e.g., including historical market data and the like), and other product information and newsletters.

The server 14 preferably interconnects to the information warehouse 16 through an information gate 20, which is connected to the warehouse 16 through a communications channel 22, preferably the Internet, an Intranet, or some other computer network. Alternatively, the information gate 20 may simply access some local storage such as a CD-ROM. The information gate is a dedicated software program that resides on a computer and that provides various control functions for a "retailer" environment, such as scheduling information downloads from the warehouse 16, updating an associated retailer database 24 with newly downloaded information, communications link connection and management and providing a remote maintenance interface. The information gate service 20 preferably includes an administrative interface through which an administrator may register products of interest to be downloaded and stored in the retailer database (specifying the date and time of the download), review transfer statistics and adjust the level of service. Although not meant to be limiting, information from the warehouse is downloaded asynchronously (e.g., in batch mode at night) to minimize the impact of the latency and bandwidth limitations of the communications channel 22.

The server 14 may be operated in one of serveral configurations. In a standalone mode, an individual broker has a unique communication link with the information warehouse via the Info Gate 20 and the server component 14 simply provides an interface to the LifeScript™ Retailer Database 24 (basic database access services). Within a single site where multiple brokers are interconnected via a LAN, a single communications link to the information warehouse may be shared via 14 and 20 (and this is the mode illustrated in FIG. 1). In Nomadic mode, a broker may take a laptop into the field to work away from the office but then brings his system back into the home office to be synchronized with his site's LifeScript™ Retailer Database (e.g. uploads new customer records, etc.). In each of the latter two configurations, multiple brokers share the LifeScript™ Retailer Database 24 and the server component provides broker authentication and access control in addition to basic database access services. Optionally, the Info Gate Component may support an Intranet communications mechanism in addition to or in place of an Internet communications mechanism.

Figure 2:
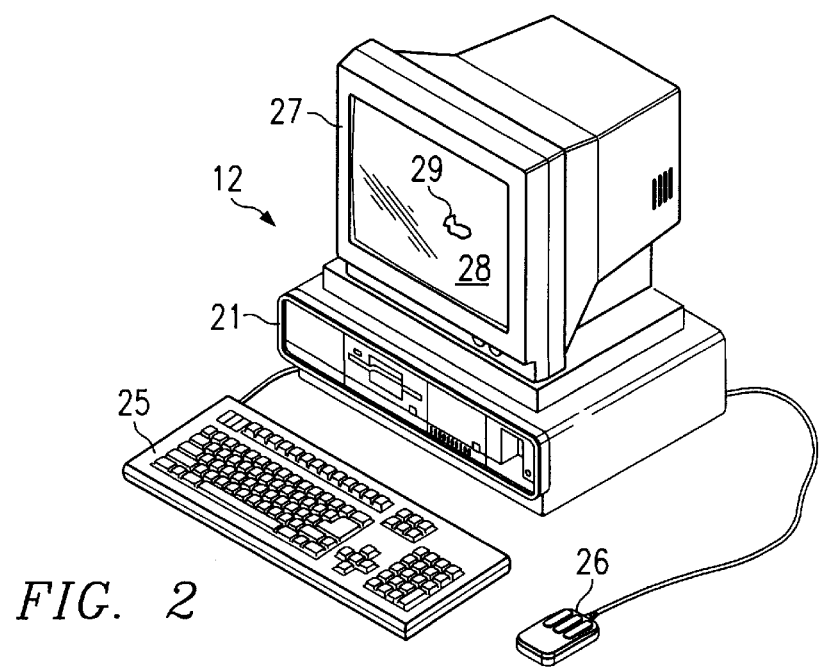
FIG. 2 illustrates a client computer comprising a system unit, a keyboard, a mouse and a display.

FIG. 2 shows a block diagram of a representative "client" computer 12, which includes a system unit 21, a keyboard 25, a mouse 26 and a display unit 27. The screen 28 of the display unit 27 is used to present a graphical user interface (GUI). The graphical user interface supported by the operating system of the computer allows the user to use a point and shoot method of input, i.e., by moving the mouse pointer 29 to an icon representing a data object at a particular location on the screen 28 and pressing on the mouse buttons to perform a user command or selection. This type of arrangement also allows the user to directly manipulate an icon from one position to another on the screen, all in a known manner.

Figure 3:
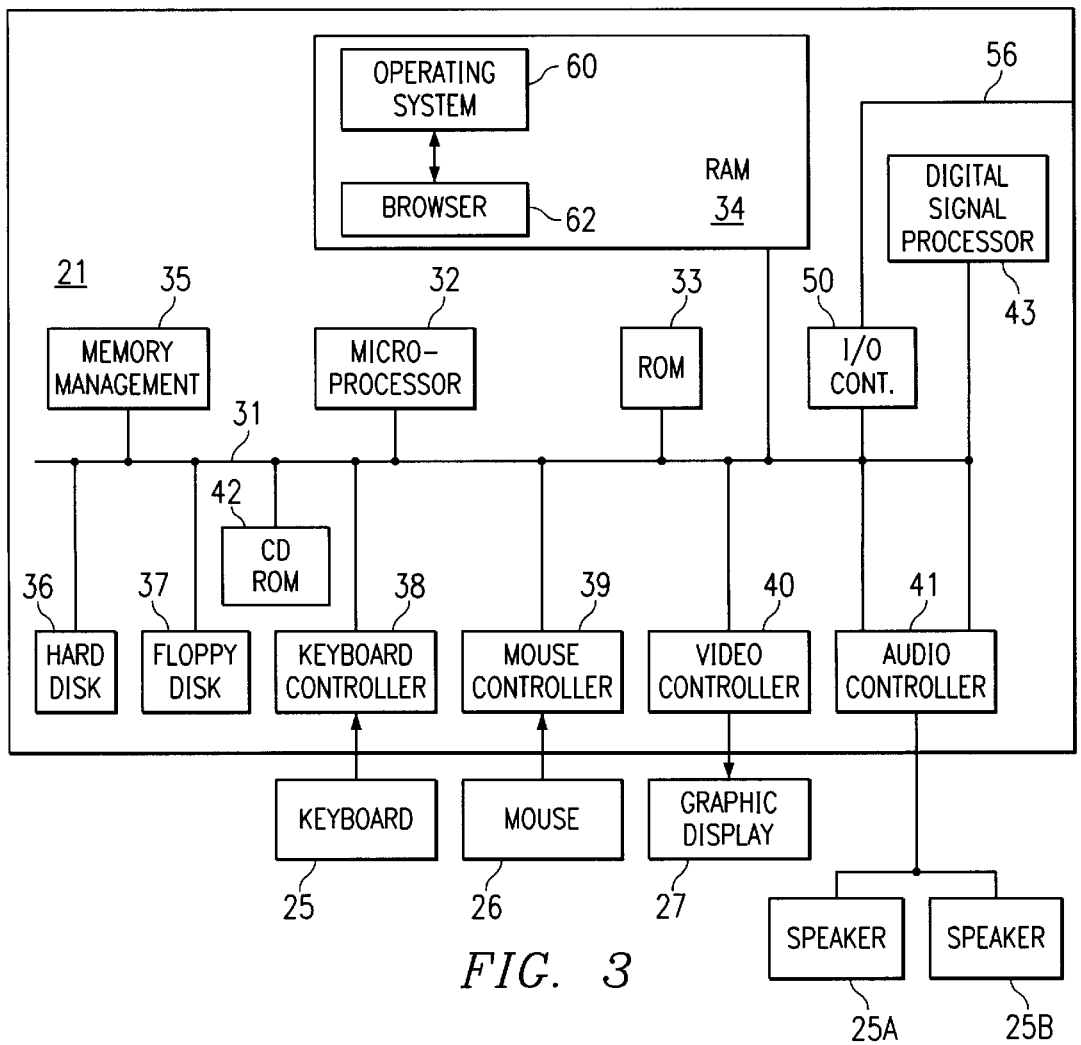
FIG. 3 is an architectural block diagram of the computer illustrated in FIG. 2.

Turning to FIG. 3, the system unit 21 includes a system bus or plurality of system buses 31 to which various components are coupled and by which communication between the various components is accomplished. The microprocessor 32 is connected to the system bus 31 and is supported by read only memory (ROM) 33 and random access memory (RAM) 34 also connected to system bus 31. The ROM 33 contains among other code the Basic Input-Output system (BIOS) which controls basic hardware operations such as the interaction and the disk drives and the keyboard. The RAM 34 is the main memory into which the operating system and application programs are loaded. The memory management chip 35 is connected to the system bus 31 and controls direct memory access operations including, passing data between the RAM 34 and hard disk drive 36 and floppy disk drive 37. The CD ROM 42, also coupled to the system bus 31, is used to store a large amount of data, e.g., a multimedia program or large database.

Also connected to this system bus 31 are various I/O controllers: the keyboard controller 38, the mouse controller 39, the video controller 40, and the audio controller 41. The keyboard controller 38 provides the hardware interface for the keyboard 25, the controller 39 provides the hardware interface for the mouse (or other point and click device) 26, the video controller 40 is the hardware interface for the display 27, and the audio controller 41 is the hardware interface for the multimedia speakers 25a and 25b. A network interface card (NIC) interfaces to the I/O controller 50 to enable communication via path 56 to other computers over the computer network.

The operating system 60 of the computer may be MS-DOS, WINDOWS 3.x, WINDOWS 95, WINDOWS NT, OS/2, AIX, or any other known and available operating system, and each computer is sometimes referred to as a machine. RAM 34 also supports a number of Internet access tools including, for example, an HTTP-compliant web browser 62. Known browser software includes Netscape Navigator, Microsoft Internet Explorer, mosaic, and the like. RAM 34 may also support other Internet services including simple mail transfer protocol (SMTP) or e-mail, file transfer protocol (FTP), network news transfer protocol (NNTP) or "Usenet", and remote terminal access (Telnet).

Figure 4:
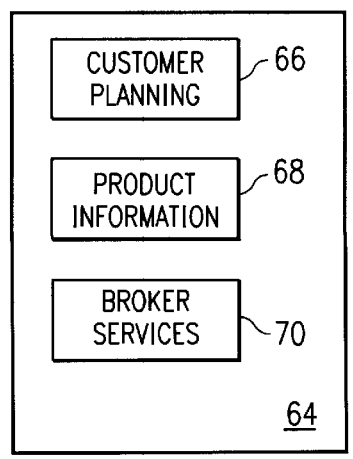
FIG. 4 is a block diagram illustrating the various functional components of the point of sale software application of the invention.

According to the invention, the computer supports a so-called LifeScript™ point of sale application 64, which is designed to be the environment in which the broker and the customer work together to develop a financial plan. As illustrated in FIG. 4, the point of sale application 64 includes three (3) main functional modules: a customer planning module 66, a product information module 68, and a broker services module 70. Customer planning module 66 is used interactively with the customer to provide a graphical framework for capturing the customer's financial goals and objectives (sometimes referred to as "life events") and mapping those events into a viable financial plan. The module also provides a software engine to apply risk analysis to the plan to illuminate financial exposures due to unforeseen (so-called "shock") events, and to recommend appropriate financial and investment products, especially insurance products. As will be seen, the graphical user interface provided by this module enables the customer to participate in all aspects of the process from goal definition through financial and insurance product selection.

The product information module 68 provides a graphical interface to review financial and insurance information in various forms, preferably in a multimedia format. This module is used to display static and dynamic charts illustrating historical and comparative product information in a variety of presentation formats. The module may also provide electronic access to the product manufacturer's customer support services.

The broker services module 70 provides a range of electronic services to support the broker including, without limitation, on-line magazine access, on-line training, on-line product purchasing, on-line database access, contact management, and the like. This module preferably also interfaces to a "backend" office management system that is used for accounting and other broker services.

Figure 5:
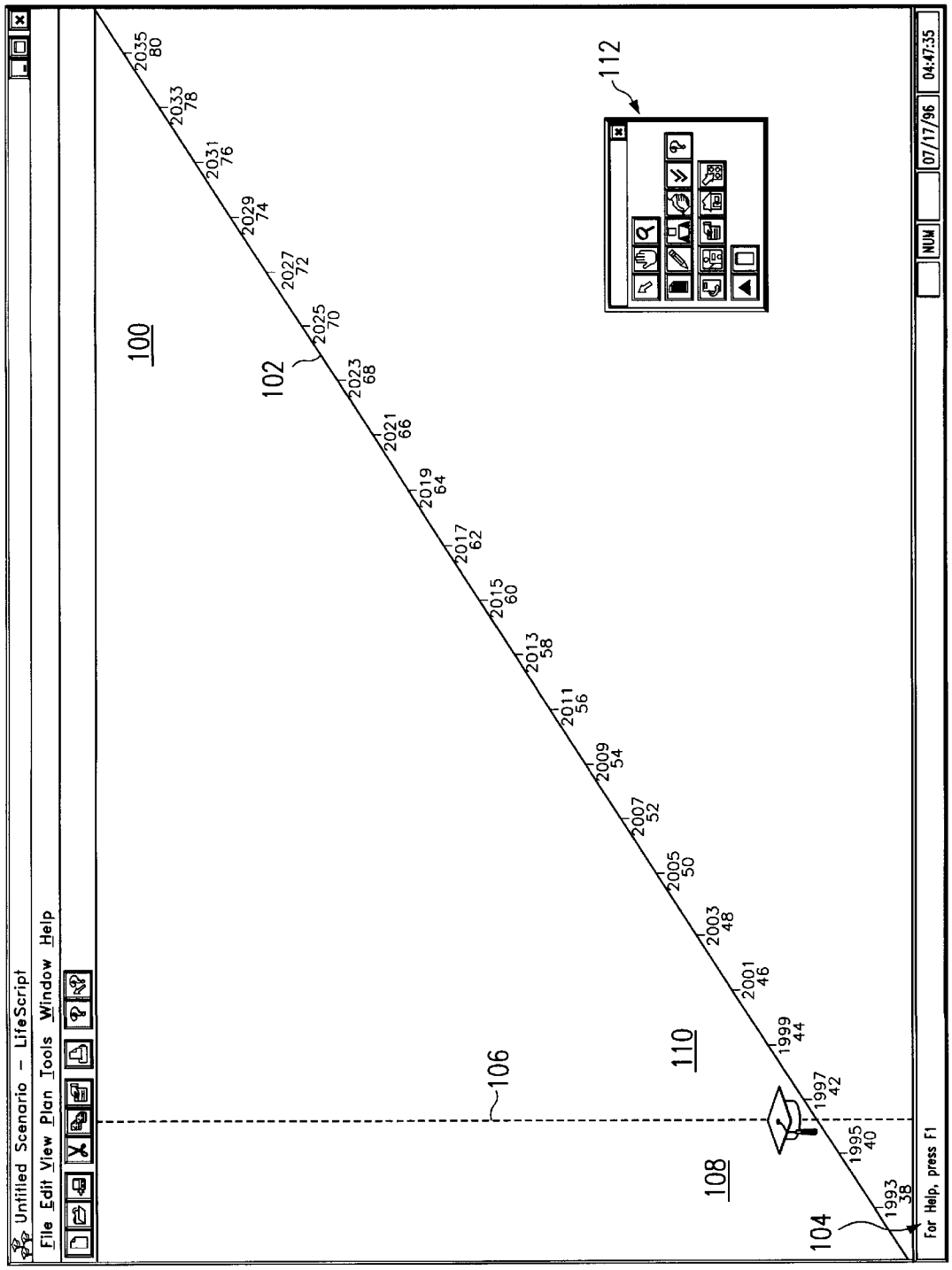
FIG. 5 is a representative graphical user interface of the client computer illustrating the lifeline "canvas" of the present invention having a timeline and a fence line.

Referring now to FIG. 5, the graphical user interface 100 of the customer planning module is now illustrated and discussed in detail. According to the invention, the interface provides a unique visually-oriented workspace in which a financial plan can be interactively created by a broker and a customer (although it is not required that both be involved). The interface 100 displays a timeline 102 which is a substantially diagonal orientation relative to a 2-dimensional coordinate system 104 on the display screen. The timeline 102 includes a graduated timescale, which preferably represents the years of a customer's life, with dates ascending as the line rises. Points along the timeline (sometimes referred to as a LifeLine™) thus are labeled with the age of the customer (or the age of any member of the customer's household) and/or the year(s). The timeline preferably begins at a particular date (e.g., the customer's age of majority) and extends "outward" in time to a reasonable date (such as the customer's actuarial age at death obtained from a knowledge database), plus some buffer (e.g., 10 years or two standard deviations). The particular date that the timeline begins is selectable and may be varied depending on the application.

Preferably, a "fence" line or similar representation 106 is displayed on the timeline at the current date, as also seen in FIG. 5. Given the preferred 2-dimensional orientation, this fence line will generally be "vertical" although as the coordinate system is rotated this orientation will shift accordingly. Also, the fence line need not be a line at all, rather, it may be represented in any convenient manner, such as be changing the color of the canvas on one side of the "imaginary" fence, or by using a shortened line or point, etc. In any event, preferably the portion 108 of the line to one side of the fence represents time before the current date and may be used to specify events that have started before the current date but are not yet completed. The portion 110 of the timeline on the other side of the fence preferably represents future time. Preferably, the software has the ability to evaluate the temporal context in which a specific icon is positioned on the canvas, and thus a user is prevented from arbitrarily placing an icon in a position that does not make sense, e.g., repositioning a future mortgage event into the past. If desired, screen "real estate" can be preserved by compressing the timescale for the past events, i.e., the timescale to the left of the line as illustrated in FIG. 5. Using the mouse, the timeline 102 may select and drag the end of the line in order to change its length. Portions of the timeline may be highlighted or otherwise accented, or used to display information other than temporal data.

It can now be seen how the canvas of FIG. 5 is used to display temporal data. According to the invention, one or more plan events are defined. In the financial planner implementation, each plan event is an identifiable event in the customer's life that has financial implications. Such events include, by way of illustration only, a mortgage, college savings, saving for retirement, etc. The timeline is used to graphically build and display plan events to illustrate when preparation for each event begins and when the event will actually occur. Movement of an icon representing the plan event allows the user to change the event's timing to facilitate the creation of a financial plan.

In particular, each event in the user's plan may be represented by an icon. Plan events may be of several types such as "life events," "shocks" and "budget" events. Life events are goals that require financial planning possibly consisting of investment (savings) and debt (payoff) components. Shocks are unpredictable events (such as death and disability) that decrease capital or income. Budget events are predictable events (such as change of income or inheritance) that affect capital or income. Plan event icons (PEI's) are preferably grouped on palettes (one of which is shown at 112) based on their category. Within a category, there may be a unique icon for each particular type of event. Palettes are accessed via a category type button on the interface tool bar, in a conventional manner. The size of the plan event icon may be varied, with larger icons incorporating user-selectable high-resolution bit maps based on or derived from photographs or the like. In this way, a broker may place a photograph of a customer's child into the bit map to customize the icon (say, for example, if the life event icon represents college funding for the child). Different icon sets may be configured by a user (e.g., a broker) based on his or her style preferences or the demographics of his or her customer base, and one or more icons may be displayed on the canvas at any given time.

Preferably, each plan event icon (PEI) is displayed above the timeline 102, with the position of the icon then determining the timing and term of the plan event. In particular, when an icon is first selected from a palette (by clicking the mouse for example), it preferably appears on the fence line, which is the current date, as shown in FIG. 5. As noted above, it is assumed that the icon represents a so-called "life event" (such as funding for a child's college education) that typically involves multiple stages and activities including planning, investment and savings, and goal execution (which may span multiple years such as the four or more years of college) and payoff. Movement of the icon from the fence line to some point into the future causes the generation of various symbols or graphical devices that represent an event "planning" phase and an event "realization" phase. This is achieved as follows in the preferred embodiment.

Referring to FIG. 6, and using direct manipulation or other conventional keyboard input technique, the user "grabs" the icon off the "fence" line and positions it on the canvas above a date on which the customer expects the event to occur. In the example above, this would be the date that a child might be expected to enter college. In the preferred embodiment, this new position of the PEI represents the "event date," which is the date on which the event in question occurs (and for which the financial planning is being carried out). In simple terms, the event date is the date on which funds will need to be expended to facilitate the life event, whatever it may be.

According to the invention, placement of the icon at the event date then causes the display of one or more symbolic representations and/or graphic devices that provide useful information to the broker/customer for planning and realization of the life event. This is illustrated in FIG. 6.

In particular, once the icon is re-positioned from the fence line to the event date (which may be then changed again, as will be seen), one or more additional "arms" are displayed relative to the icon and the timeline 102. Preferably, a first arm 120 has a first segment 120a that extends "horizontally" from the (repositioned) icon back to the fence line (or some other vertical reference line) and a second segment 120b that projects "vertically" downward from the first segment of the first arm to thereby intersect with the timeline itself. The second segment 120b intersects the timeline at a so-called "start date," which will typically be the current date (but need not be). The area 122 enclosed by the timeline 102 and the first arm 120 (such area being to the left of the PEI) then forms the planning phase for the life event.

Movement of the PEI to the event date (corresponding to the start of the event) also preferably causes a second arm 124 to drop "vertically" from the icon to intersect with the timeline, and a third arm 126 to extend "horizontally" from the icon to intersect with the timeline 102 at some future date. The intersection of the second arm 124 with the timeline determines the event date, and the intersection of the third arm 126 with the timeline represents an end date at which the event is fully realized (e.g., all financial obligations are complete including payouts and/or loan repayments). The area 128 enclosed by the timeline and the second and third arms represents the realization phase for the life event.

Thus, positioning the PEI relative to the timeline (preferably above it, although this is not required as the software may be programmed to display the relevant graphics from below the timeline) causes the display of an event instance (comprising areas 122 and 128) defined by the first, second and third arms. The second and third arms correspond to the horizontal and vertical projections of the icon position (at the event date) relative to the timeline 102. More generally, it can be seen that positioning of the life event icon causes one or more projections of the icon position in the 2-dimensional coordinate system of the timeline, with the timeline running through that system along a diagonal. Positioning the PEI is accomplished by using the mouse and the cursor in a known manner to directly manipulate the icon from the fence line (or even directly from a palette) to a given position. As used herein, "horizontal" and "vertical" are to be considered "relative" to the 2-dimensional coordinate system, which may itself be rotated to some degree. As can be seen, placement of the PEI in a given (x,y) position relative to the timeline 102 thus generates an event "instance" defined by the first, second and third arms.

If desired, the arms or any one or more of them are displayed in a particular intensity that may vary in intensity and/or color. Where a given arm intersects the timeline, the particular age/year may also be displayed. One or more of the arms may be "virtual" in the sense that they are not displayed at all, but only the resulting areas 122 or 128 (or both) are highlighted or otherwise accented. Alternatively, the intersection of the arm relative to the timeline might be displayed, in which case the arm itself (or some portion thereof) might be omitted. One or both areas 122 or 128 may be highlighted even if one or arms are also displayed.

Referring now to FIGS. 7A–7D, the user (e.g., the broker, the customer, or both of them) may click on and drag either the PEI or one or more the arms themselves. As seen in FIG. 7A, dragging the icon itself horizontally or dragging the second arm 124 changes the event date. The portion of the figure shown in phantom represents the positions of the arms (and the icon) prior to repositioning. Typically, such action will not alter the end date (although in some cases (not shown) this may occur given a particular type of funding event). As seen in FIG. 7B, dragging the icon vertically or dragging the third arm 126 or the extended segment 120a changes the end date, however, the start date and event date remain unchanged. FIG. 7C illustrates what happens when the icon is dragged at an angle relative to the timeline. This causes the event date and the end date to change simultaneously. FIG. 7D illustrates that dragging the segment of the first arm 120b causes the start date to change.

Thus, according to the preferred embodiment of the invention, direct manipulation is the graphical method for changing the temporal attributes of a particular life event. Although not shown in detail, it should be appreciated that many variations of the above-preferred technique may be implemented within the scope of the present invention. Thus, for example, it is not required that a PEI be positioned on the fence line when it is first selected; rather, the PEI may be dragged directly from the palette and then dropped in a position. Such an operation might be used, for example, when the icon position corresponds to the start date itself as opposed to the event date. In such an embodiment, the first arm could be omitted and the second and third arms (i.e., the vertical and horizontal projections of the icon position relative to the timeline) would define an event instance. Or, turning back to the preferred embodiment (where the PEI is positioned over the event date), it may be desirable to alter the start date (e.g., by dragging the second segment 120b) to an earlier position (where the customer has already begun funding for the event prior to the current date represented by the fence line). Of course, more than three (3) arms (or similar graphical representations) could be used to illustrate an event instance.

Thus, according to the invention, at least one plan event icon is positioned relative to the timeline 102 by dragging it (preferably from the fence line) with a mouse or by selecting the icon and using keyboard entry keys (directional arrows). Repositioning of the PEI as shown in FIGS. 7A–7D modifies the timeframe for the life event, re-sizing the planning and/or realization phases dynamically.

In the preferred embodiment, PEI repositioning as illustrated in FIGS. 7A–7D causes the entire state of the underlying financial plan to be re-evaluated. In particular, the cost of each event is recalculated, the details of the funding are recalculated, and the cash flow requirements of each event is compared against the pre-entered budget for the plan. In the event the budget is insufficient to support the required principal and payment demands based on the repositioning of one or more icons, the impacted time period along the timeline 102 may then by visually highlighted. Such highlighting may involve coloring the impacted segment of the LifeLine™ and shading or coloring a vertical band up from the line to the top of the window to more graphically illustrate the region impacted.

Once a plan event icon has been added to the canvas and positioned (or re-positioned) to define a selected event date, additional information about the event is specified using one or more pop-up interfaces referred to an "event property sheets." Although not meant to be limiting, each event has associated therewith an event property summary sheet, each of which in turn has one or more tabs or pop-up interfaces for providing selectively more-detailed data and financial details. This operation of the present invention can now be described.

In particular, once an icon is positioned on the canvas (thus defining the start of planning phase, the event date and the end of the realization phase), additional information about the cost of the event, the plan for funding the event and the assignment of actual investment and insurance products are provided through the event property sheet. Property sheets are user interface components (preferably pop-up windows that appear on the canvas) through which the broker and his/her customer collectively provide details by filling-in appropriate numerical and other data.

Figure 8:
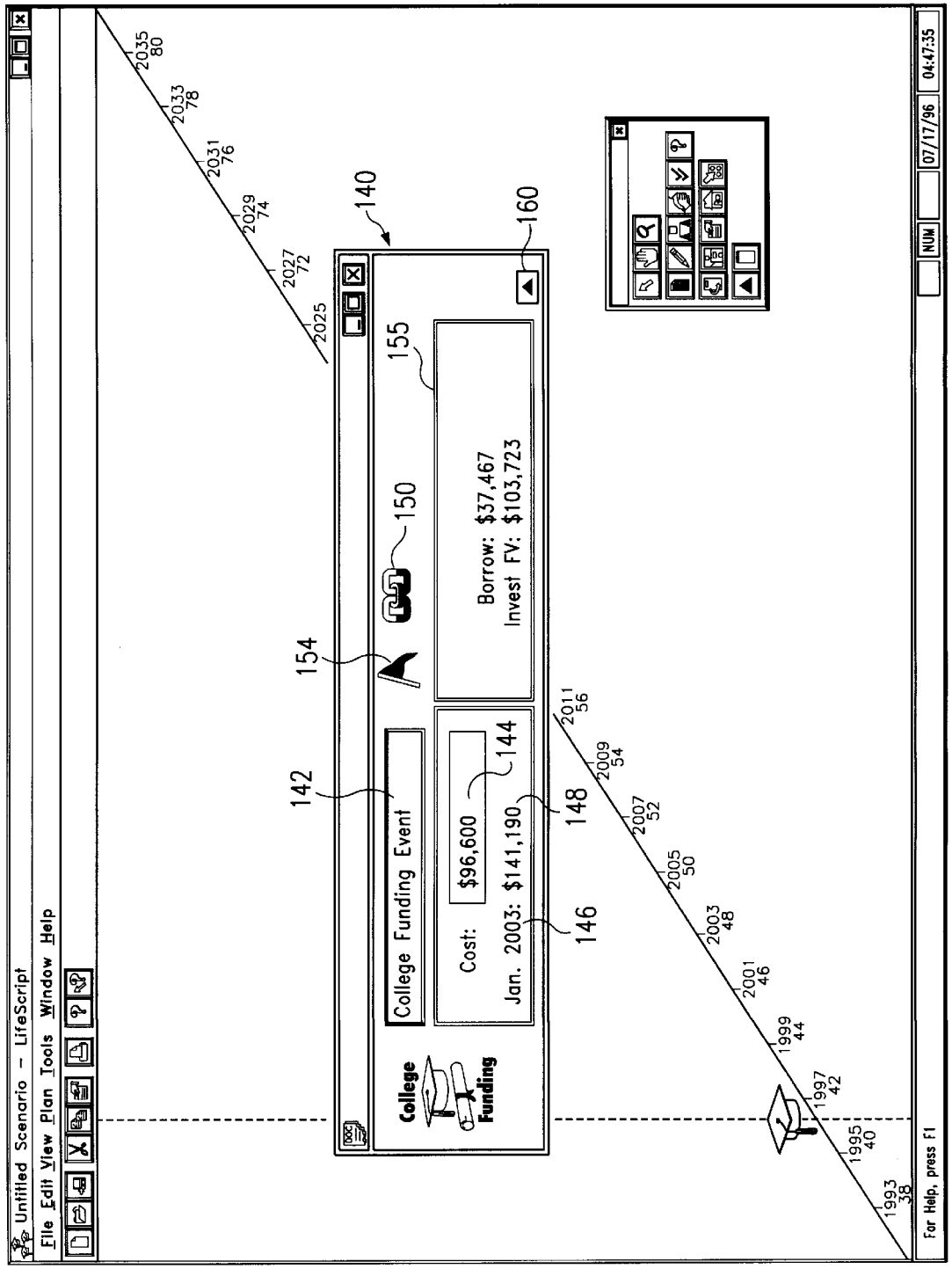
FIG. 8 illustrates a representative event property summary sheet window for a particular life event.

Referring now to FIG. 8, an initial view of the property sheet is the property sheet summary view 140. The sheet is configured to run in a window of the interface, which may be sized and/or minimized in a known manner. This view provides at-a-glance information about the event such as its cost, the amount of the cost to be met through investment, the amount of the cost to be met through borrowing and the level of funding provided for to date. In this example, the life event is college funding for the customer's child. In such case, the property sheet 140 may include one or more of the following fields: a description field 142, a cost field 144 (representing the cost of the event is the event occurred at a current date), a future date field 146 (the event date), and a future value cost field 148 (representing the cost of the event on the date the event will occur as determined by the date field 146 taking into account the projected rate of inflation and taxes), a link status icon 150 (shows at-a-glance whether there are no/some/complete set of assets linked into the life event), a budget flag 154 (representing whether or not lump sum and installment funds for the event are within the customer's budgetary constraints), a percent committed indicator (not shown) providing a visual indication of how closely the plan values match the projected cost values. A table 155 shows the amount borrowed and the future value of the investments for the life event.

The fields of the summary property sheet 140 may be edited directly; alternatively, the fields are updated as the user progresses through one or more stages of planning the life event using one or more tab interfaces, such as illustrated in FIGS. 9–12 (not all of which are required for each life event). An "expand" button 160 on the summary sheet exposes several additional interfaces required for providing lower level detail, through one or more "tabs." Upon being selected, a particular lower-level tab becomes visible and appears to be attached to the summary property sheet. Other tabs appear to be behind the selected tab (analogous to holding a stack of index cards where the tabs are the cards).

Figure 10:
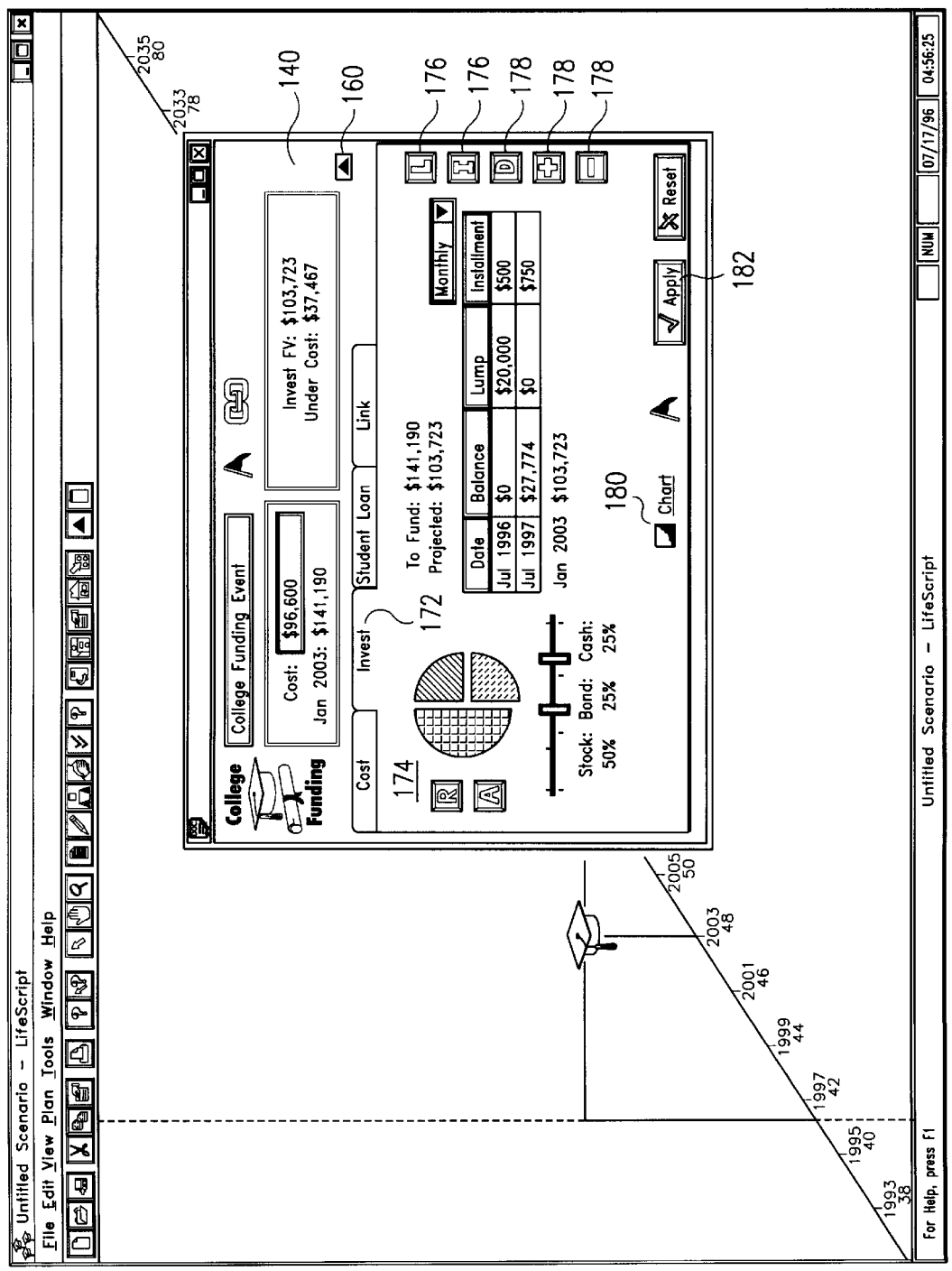
FIG. 10 illustrates an investment tab user interface for determining asset allocation strategies, investment amounts and investment timing.
Figure 11:
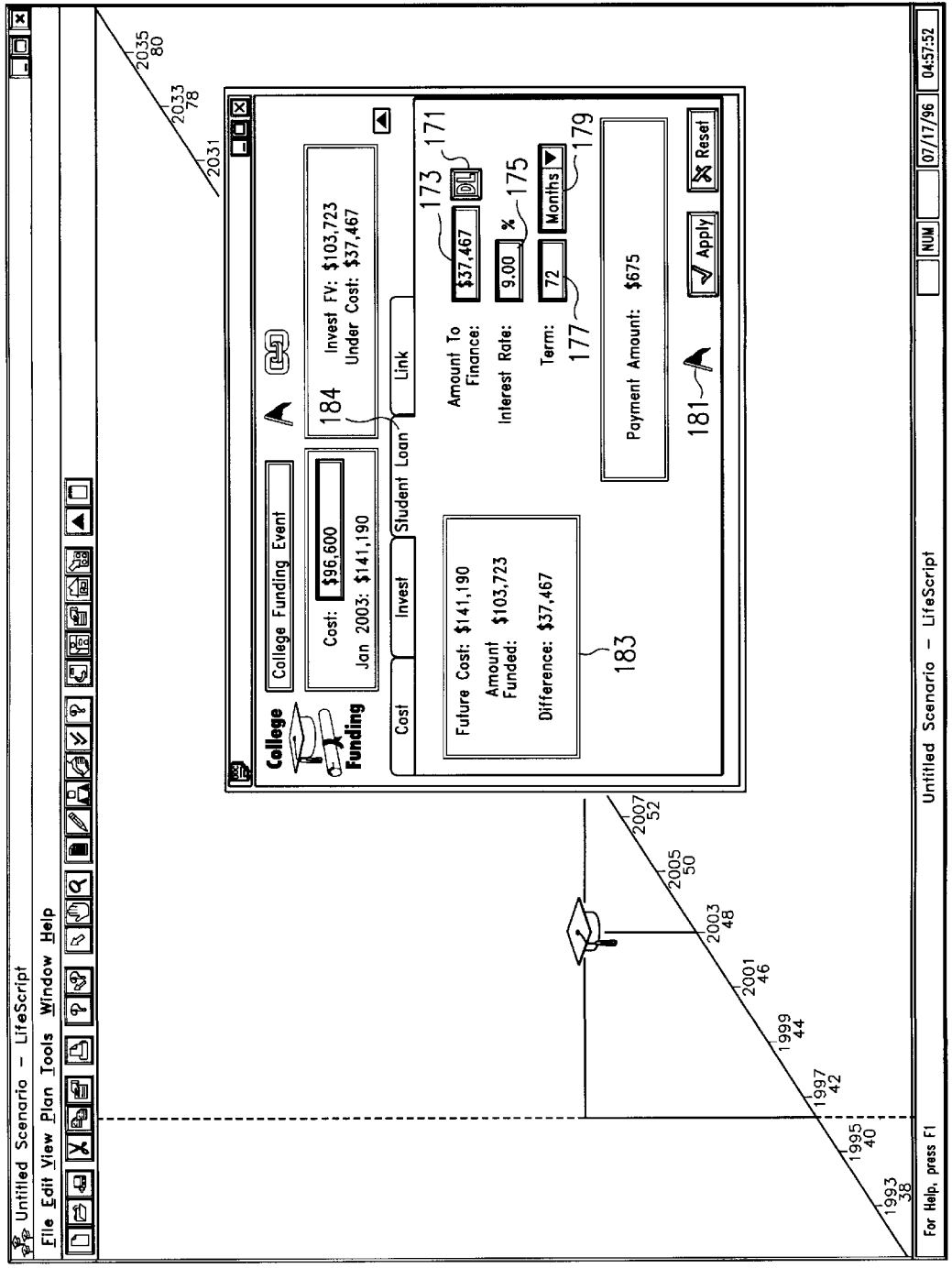
FIG. 11 illustrates a borrow tab user interface for specifying loan details.
Figure 12:
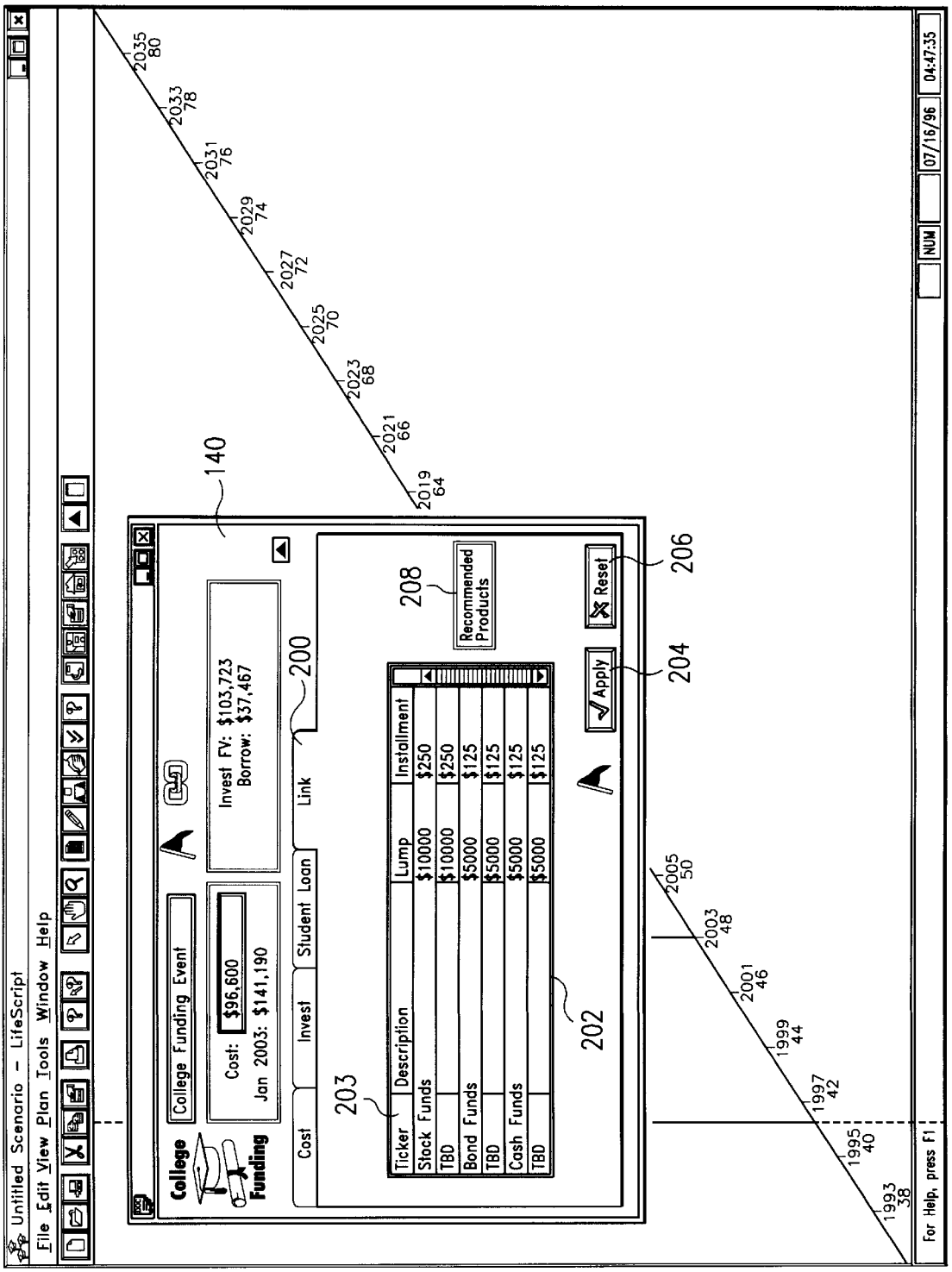
FIG. 12 illustrates a link tab user interface for identifying financial products in which a customer will or has invested to meet his financial plan.

Referring now to FIGS. 9–12, the additional data is provided and/or obtained through the functionally-specific tabbed interfaces including: a cost tab (FIG. 9), an investment tab (FIG. 10), a borrowing tab (FIG. 11) which is identified as a "Student Loan" given the particular life event illustrated, and a link tab (FIG. 12). As seen in the figure, the tabs are positioned in the "workflow" order that a broker might typically work through to facilitate the planning process (although the orientation of the changes is selectable). Each of the tabs comprises a work area for the broker beneath the summary sheet 140. Changes made in the particular worksheet show the broker/customer the effects of the changes on the financial plan but preferably do not become part of the plan until the "Apply" button on the particular interface is selected. Once applied, data from the worksheet is transferred to and displayed on the summary sheet 140 (which is still present in the overall window). Throughout the process, proposed changes are checked against the customer's budget so as to identify cash flow problems in realtime.

Figure 9:
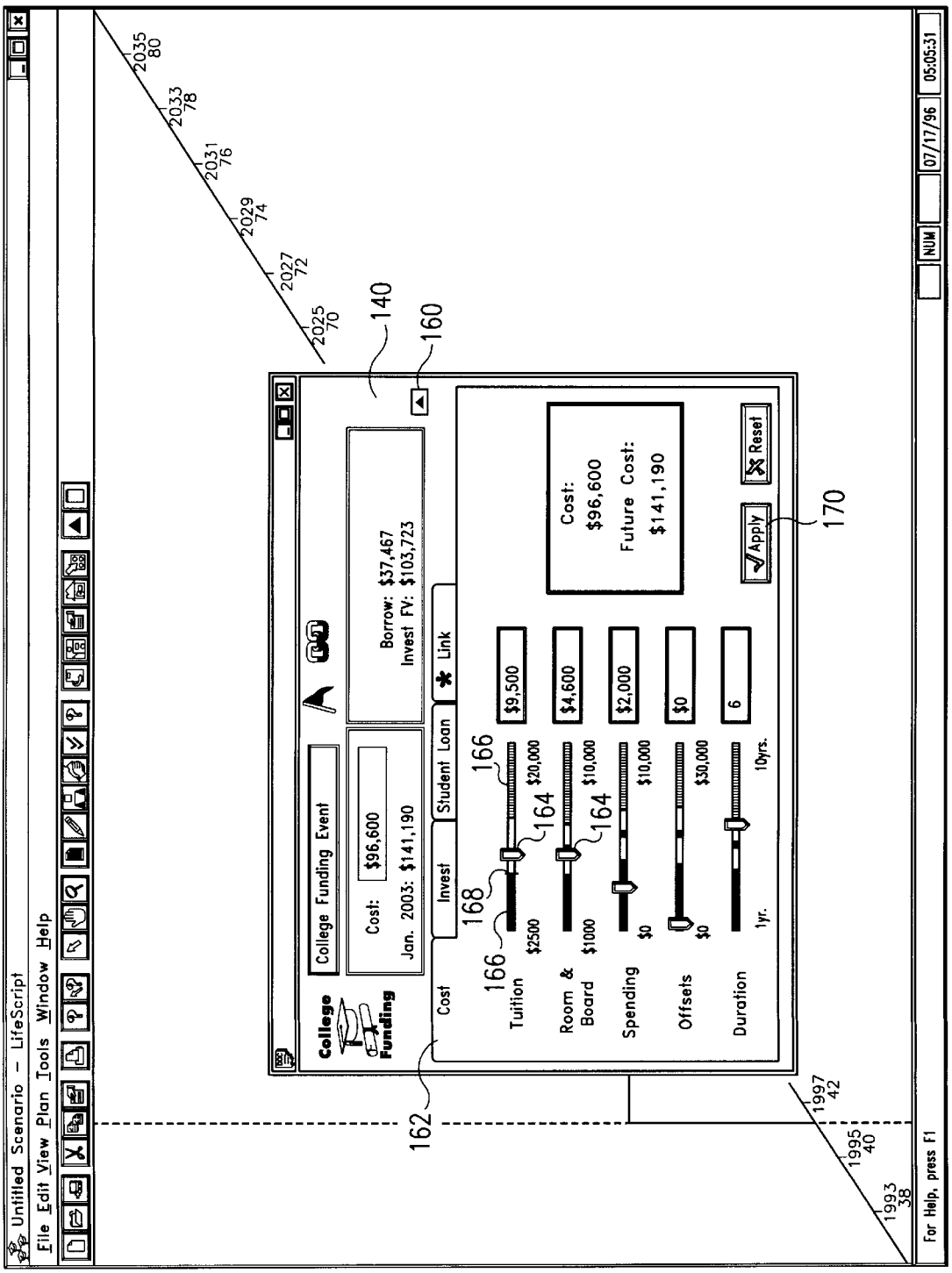
FIG. 9 illustrates a cost tab user interface for specifying cost contributions for an event.

As seen in FIG. 9, the cost tab 162 includes a worksheet having a number of user interface components, typically one or more mouse-driven sliders 164, for specifying the cost contribution of each cost constituent (e.g., in the case of college cost, the tuition, living expenses, room and board, etc.) that collectively are expected to make up the total cost of the event. The background associated with one or more of the constituents may be color-coded (indicated by shaded regions 166) or include partitions 168 that reflect how the indicated constituent compares to some calculable average cost for the same component. The data which determines the location of the partitions (or color codes) may be derived from suitable demographic data (e.g., the average cost of tuition for private 4 year colleges in the United States, or some such other user-selectable parameter(s)) obtained via the computer network or otherwise made available to the broker's system. In this way, the user can obtain an immediate indication of how his or her child's tuition costs (for example) might compare to some average, as the projected cost is illustrated. After the sliders are positioned, the Apply button 170 is clicked, which causes the data to be entered in the summary sheet 140.

FIG. 10 illustrates the investment tab 172, which includes a number of user interface components for determining the appropriate asset allocation strategy (e.g., a split between stocks, bonds and cash), investment amounts (including down payments and installments) and investment timing. The investment tab 172 includes a mix specification area 174, lump and installment calculation buttons (the funding table) 176, table manipulation buttons 178, and a chart button 180. On initial invocation, the system uses a set of artificial intelligence rules to determine and display a set of recommended asset allocation mix. The mix specification displays the stock/bond/cash mix using a pie chart (or similar representation) and associated sliders. The system may superimpose the word "Recommended" (the R button is the Recommended Asset Allocation), "Selected" or "Actual" (the A button is the actual mix of assets) over the pie chart based on the source of the displayed mix. The user may override the recommended mix through direct manipulation of the mix specification sliders or by requesting that the system calculate the actual mix based on the assets actually linked to the event. Buttons in the mix specification area allow the user to cycle between showing the recommended, selected or actual mix at any time. The funding table 176 is used to enable the user to plan changes in the level of installments or additional lump sums to be applied now and in the future as well as the value of the investment at the time of change. The lump and installment values are initialized to zero when the interface is first opened. Calculate buttons 176 are provided to allow the user to calculate quickly the lump or installment required to bring the investment to 100% of the cost given the selected asset allocation. The lump is calculated using whatever value is present in the installment field and vice versa. Table manipulation buttons 178 are provided to add and delete rows (each row representing a change in funding) to the table. Once the future funding changes have been entered via the Apply button 182, the data appears in the summary sheet 140.

The borrow tab 184 is illustrated in FIG. 11 and includes user interface components for specifying loan details (e.g., amount, interest, period and term) and displaying the payment amount. This interface is used to plan for any borrowing that may be required to finance or complete the financing of a particular event. In some cases, of course, the "borrowed" component is much larger than the investment component, and vice versa, depending on the life event. The borrow tab (shown as the Student Loan Tab here) provides a button (the DL button) 171 for quickly initializing an amount to finance field 173 with the delta (i.e., the difference) between the cost of the event, and the amount funded through investment. The user may enter data directly into the amount, interest rate 175 and term 177 fields (which are given reasonable default values based on the type of life event). A pull down list 179 is used to define the units of the event term (e.g., monthly, etc.). The payment amount is dynamically calculated based on these fields and checked against the budget, setting the budget flag 181 as appropriate. The derivation of the amount to finance is displayed in a panel 183 on the tab and is based on data from the Cost and Invest tabs.

Figure 13:
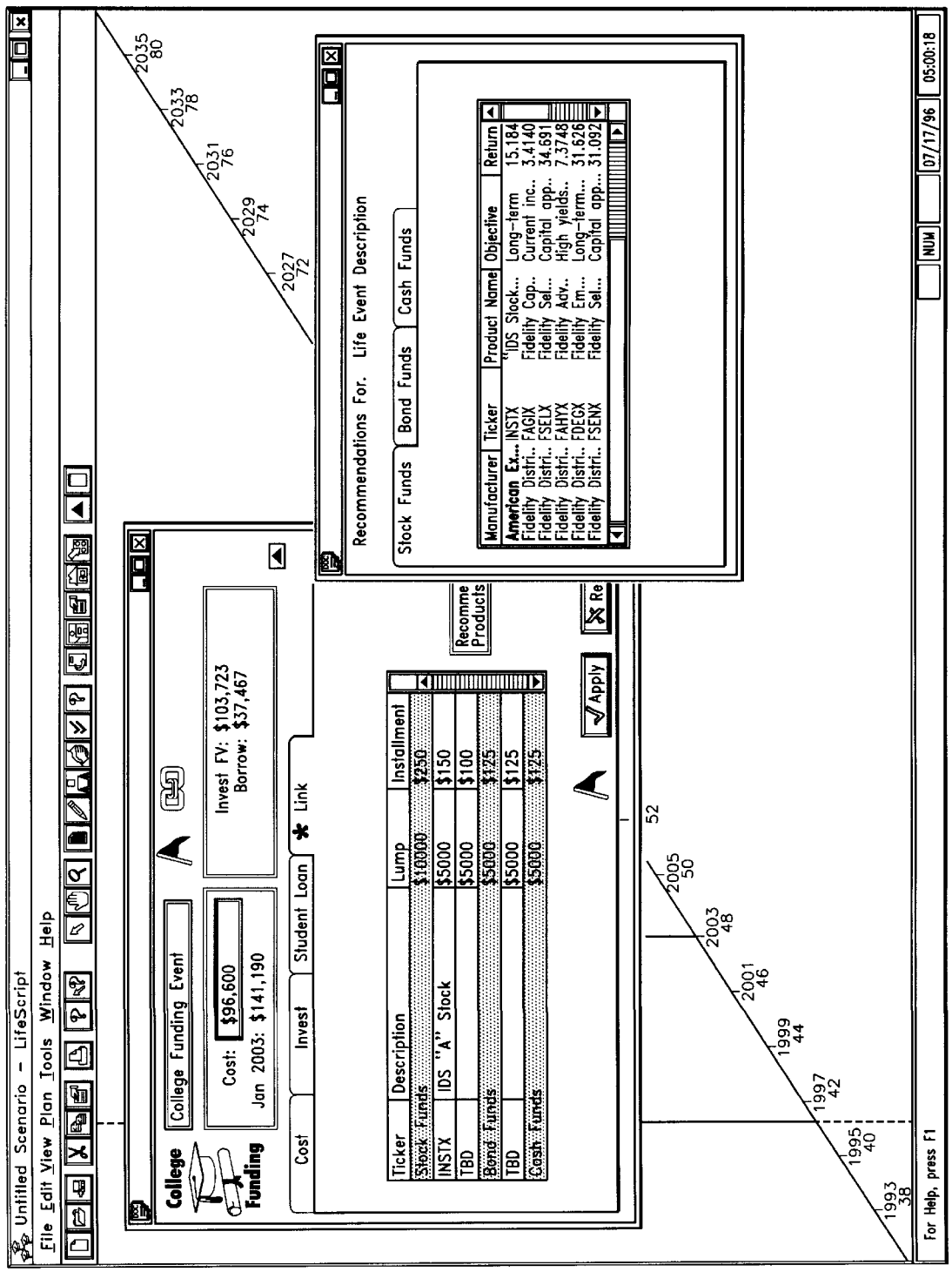
FIG. 13 illustrates a recommendations user interface window that pops up when a Recommended Products button is activated in the interface of FIG. 12.

FIG. 12 shows the link tab 200, which is a table-based interface listing, by product name, the mutual fund, insurance and loan products in which the customer will or has invested in to meet the financial requirements of the life event. Actual down payment and installment values are also displayed. The link tab is used to assign or "link" actual financial instruments to the funding plan for the particular event. In particular, link 200 includes a linked assets table 202, which preferably has a separate section for stocks, bonds and cash. The label row for each section displays the amount for the type of asset specified in the investment tab. Initially, each (non-zero) section has a data row labeled "TBD" (to be determined) with the lump and installment set to the values specified on the investment tab. If the user wishes, the ticker field 203 of the table can be directly edited to specify a product. Any text entered in field 203 is first validated. When the user selects the Apply button 204, the user's selections and specified values are compared to those specified in the investment tab. If the mix of assets or the values do not match the investment tab, a message is displayed indicating that the user has "changed" the funding model. If the user accepts the changes, the values on the investment tab are updated to reflect those actually entered on this tab. If the user does not accept the changes, the tab is considered "in progress" and the percent committed indicated on the summary sheet 140 reads 0%. The reset button 206 resets the tab to the state it was in when first entered, with all values matching the investment tab and all linked asset table rows set to TBD. Clicking on the "Recommendations" button 208 causes the retrieval of a list of products that satisfy the requirements of the life event. This is illustrated in FIG. 13. When the user selects a recommended product (preferably by dragging the product from the recommendations list in FIG. 13 to the link tab which remains on the display as shown), the product's ticker and description are placed in the appropriate (stock, bond or cash) "TBD" entry in the table. If the user selects more than one product in a category, additional rows are added to the table with initial values of zero. The chart button pops up a chart window (not shown) displaying a chart of the value of each of the linked assets over time.

Figure 14:
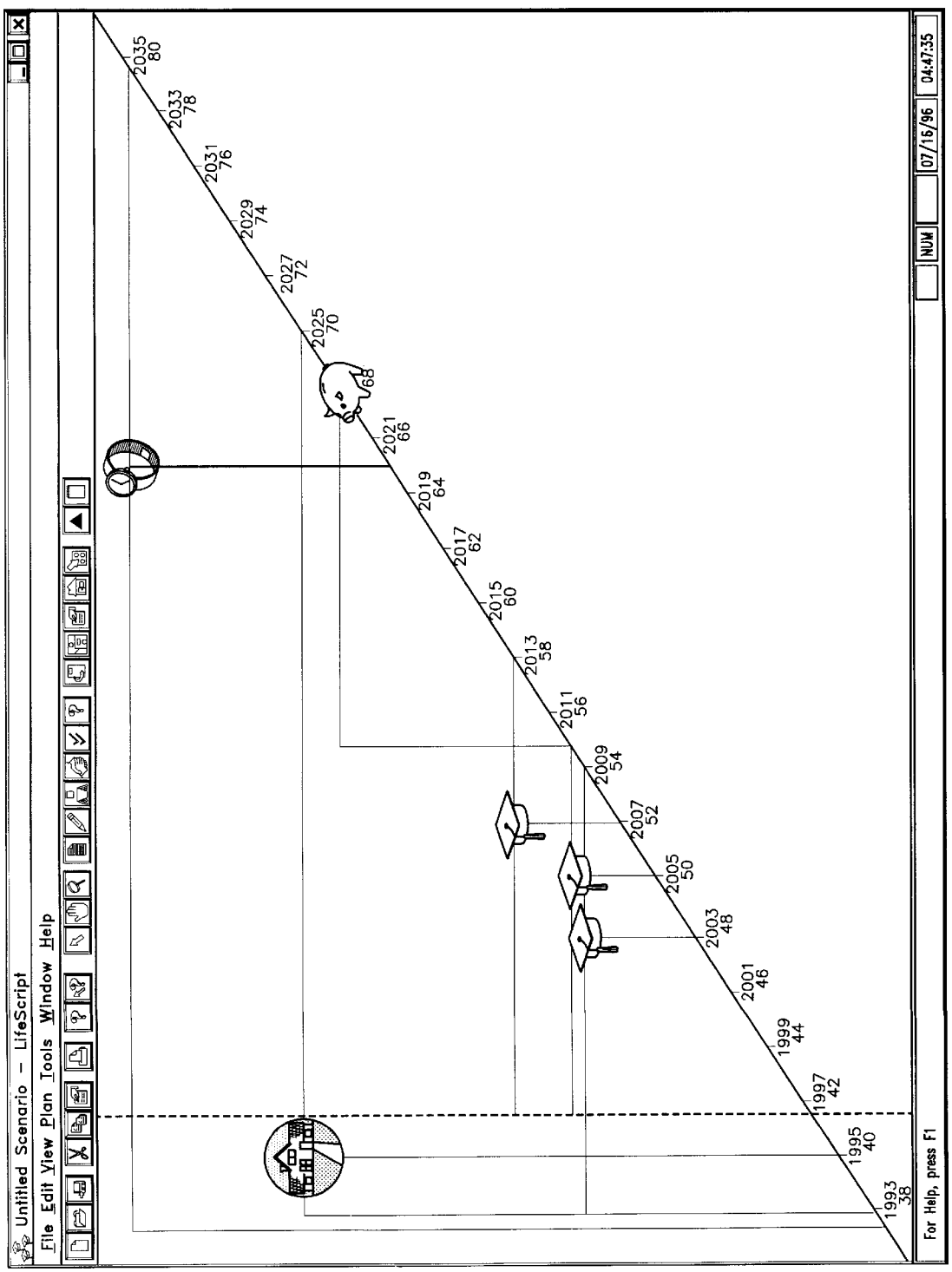
FIG. 14 illustrates how multiple life events might appear on the canvas.

It should be appreciated that the various user interface components and organization illustrated in FIGS. 9–13 is merely exemplary of a preferred embodiment, and should not be construed as limiting the scope of the invention. Under appropriate circumstances, one of more of the tabs could be combined or restructured so that the information is collected and/or displayed in a manner that differs from that illustrated. The particular interface components within each tab might be varied, or the information collected or displayed may be augmented. Further, while assets are linked into the plan, it is not required that they be assigned at the time the funding plan for the particular life event is determined. The user thus may review all identified financial commitments at one time and assign financial instruments as appropriate. All such variations and modifications are considered within the scope of the present invention. Of course, multiple life events may be planned for at one time, as illustrated in FIG. 14.

One of ordinary skill in the art will appreciate that the "user" referenced above should be broadly construed to mean the broker, the customer, or both of them working collaboratively during the planning process. It will also be appreciated that information regarding financial products, financial markets, past and contemporaneous market information and the like as used in the various interfaces of the computer-implemented planning system are readily obtainable from the warehouse 16 via the communications channel 22.

One of the preferred implementations of the invention is as a set of instructions in a code module resident in the random access memory of the user's personal computer. Until required by the computer, the set of instructions may be stored in another computer memory, for example, in a hard disk drive, or in a removable memory such as an optical disk (for eventual use in a CD ROM Drive) or floppy disk (for eventual use in a floppy disk drive). In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

One of ordinary skill will recognize that the inventive features of the invention may be varied or modified. Thus, for example, while the timeline on the interface is shown in a 2-dimensional representation, it should be appreciated that the display may also be made in three (3) dimensions. All such variations are considered within the scope of the invention.

Having thus described my invention, what we claim as new and desire to secure by Letters Patent is set forth in the following claims:

1. A method for displaying temporal data for use in financial planning on a display screen of a computer, comprising the steps of:

displaying a timeline on the display screen in a substantially diagonal orientation relative to a 2-dimensional coordinate system, wherein a first axis of the coordinate system represents a financial amount and a second axis of the coordinate system represents a time amount; and retrieving and positioning an icon on the display screen to cause the display of at least one or more representations of the icon position in the 2-dimensional coordinate system relative to the timeline.

2. The method as described in claim 1 further including the step of repositioning the icon relative to the timeline.

3. The method as described in claim 1 wherein the icon comprises a bit map.

4. The method as described in claim 1 wherein the timeline is divided into increments each representing a predetermined time period.

5. The method as described in claim 4 wherein at least one set of increments on the timeline have a predetermined timescale that differs from a timescale of a second set of increments.

6. The method as described in claim 1 further including the step of displaying a fence line that intersects the timeline at a current date.

7. The method as described in claim 6 wherein the icon is retrieved from the fence line.

8. The method as described in claim 6 wherein the one or more representations of the icon position include a first projection parallel to a first axis of the 2-dimensional coordinate system and intersecting the timeline at an event date, and a second projection parallel to a second axis of the 2-dimensional and intersecting the timeline at an end date.

9. The method as described in claim 8 wherein the icon represents an event and an area bounded by the first and second projections and the timeline represents a period of time associated with the event.

10. The method as described in claim 6 wherein the one or more representations of the icon position include a first projection having a first segment parallel to the fence line and intersecting the timeline and a second segment normal to the first segment and intersecting the icon, a second projection parallel to a first axis of the 2-dimensional coordinate system and intersecting the timeline at an event date, and a third projection parallel to a second axis of the 2-dimensional and intersecting the timeline at an end date.

11. The method as described in claim 10 wherein the icon represents an event and a first area bounded by the first and second projections and the timeline represents a first period of time associated with the event, and wherein a second area bounded by the second and third projections and the timeline represents a second period of time associated with the event.

12. The method as described in claim 11 wherein financial data is determined for the first area and the second area.

13. A method for displaying temporal data on a display screen of a computer to facilitate financial planning for a life event having an event date, at which payment for the event commences, and an end date, at which payment for the event is completed, comprising the steps of:

displaying a timeline in a substantially diagonal orientation relative to a 2-dimensional coordinate system on a display screen, wherein a first axis of the coordinate system represents a financial amount and a second axis of the coordinate system represents a time amount and is divided into increments representing predetermined time amounts of a time scale;

displaying a fence line that intersects the timeline at a current date; and retrieving an icon corresponding to the event from the fence line and positioning the icon on the display screen to cause the display of at least one or more representations of the icon position in the 2-dimensional coordinate system relative to the timeline.

14. The method as described in claim 13 further including the step of repositioning the icon to modify temporal attributes of the life event.

15. The method as described in claim 13 wherein the time amounts of the second axis are one or more calendar units.

16. The method as described in claim 13 wherein the time amounts of the second axis are one or more age units.

17. The method as described in claim 13 wherein the one or more representations of the icon position include a first projection having a first segment parallel to the fence line and intersecting the timeline and a second segment perpendicular to the first segment and intersecting the icon, a second projection parallel to a first axis of the 2-dimensional coordinate system and intersecting the timeline at the event date, and a third projection parallel to a second axis of the 2-dimensional and intersecting the timeline at the end date.

18. The method as described in claim 17 wherein a first area bounded by the first projection and the timeline represents a planning phase for the life event during which funding for the life event is expected to occur, and wherein a second area bounded by the second and third projections and the timeline represents a realization phase for the life event during which payment for the life event is expected to occur.

19. A computer system to facilitate financial planning for a life event having an event date, at which payment for the event commences, and an end date, at which payment for the life event is completed, comprising:

a processor;

input means;

a display device having a screen;

program control means operative under the control of the processor (a) for displaying on the screen a timeline in a substantially diagonal orientation relative to a 2-dimensional coordinate system, wherein the first axis of the coordinate system represents a financial amount and the second axis of the coordinate system represents a time amount; and (b) for controlling a position of an icon associated with the life event relative to the timeline in response to the input means.

20. The computer system as described in claim 19 wherein the program control means is responsive to positioning of the icon for generating at least first and second representations of the icon position in the 2-dimensional coordinate system relative to the timeline, the first and second projections intersecting the timeline at the event date and the end date.

21. The computer system as described in claim 19 wherein the program control means further includes calculation means responsive to any repositioning of the icon position to dynamically recalculate financial data associated with information displayed on the screen.

* * * * *